United States Patent
Park

(10) Patent No.: US 9,119,161 B2
(45) Date of Patent: *Aug. 25, 2015

(54) METHOD FOR CONTROLLING POWER IN WIRELESS TELEPHONE SET

(75) Inventor: Jae-Sun Park, Suwon-shi (KR)

(73) Assignee: Samsung Electronics Co., Ltd (KR)

( * ) Notice: Subject to any disclaimer, the term of this patent is extended or adjusted under 35 U.S.C. 154(b) by 469 days.

This patent is subject to a terminal disclaimer.

(21) Appl. No.: 13/243,263

(22) Filed: Sep. 23, 2011

(65) Prior Publication Data

US 2012/0015698 A1 Jan. 19, 2012

Related U.S. Application Data

(63) Continuation of application No. 09/739,560, filed on Dec. 18, 2000, now Pat. No. 8,050,724.

(30) Foreign Application Priority Data

Dec. 29, 1999 (KR) .................. 10-1999-0065274

(51) Int. Cl.
*H04B 1/16* (2006.01)
*H04W 52/02* (2009.01)
*H04B 1/40* (2015.01)

(52) U.S. Cl.
CPC .............. *H04W 52/028* (2013.01); *H04B 1/40* (2013.01); *H04W 52/0229* (2013.01); *H04W 52/0254* (2013.01)

(58) Field of Classification Search
CPC .................... H04W 52/0229; H04W 52/0251; H04W 52/0258; H04W 52/02; H04W 52/0219; H04W 52/0235; H04W 52/0264; H04W 52/0274; H04W 52/029; H04W 52/44; H04M 1/73; H04M 1/72519; H04B 1/40; H04B 1/1615
USPC .............. 455/343.1–343.6, 574, 127.1, 127.5
See application file for complete search history.

(56) References Cited

U.S. PATENT DOCUMENTS

| | | |
|---|---|---|
| 5,369,798 A | 11/1994 | Lee et al. |
| 5,392,287 A | 2/1995 | Tiedemann et al. |

(Continued)

FOREIGN PATENT DOCUMENTS

| | | |
|---|---|---|
| JP | 09-275587 | 10/1997 |
| JP | 11-088252 | 3/1999 |

(Continued)

OTHER PUBLICATIONS

Chinese First Office Action dated Nov. 1, 2002, issued in a counterpart Application No. 00137178.9.

*Primary Examiner* — Lana N Le
(74) *Attorney, Agent, or Firm* — The Farrell Law Firm, P.C.

(57) ABSTRACT

A method for controlling power in a wireless telephone set is provided. The method includes controlling a power supply to a receiving section and a transmitting section by using a transmitting section turn-on signal to turn on the transmitting section, when the transmitting section turn-on signal is received in a slot mode for alternating between a receiving condition and a sleeping condition at predetermined intervals, and when the transmitting section turn-on signal is not received, controlling the power supply to the receiving section according to the receiving condition of slot mode control signals during the slot mode when no interrupting signal has been detected.

20 Claims, 6 Drawing Sheets

(56) References Cited

U.S. PATENT DOCUMENTS

| | | |
|---|---|---|
| 5,465,401 A | 11/1995 | Thompson |
| 5,519,762 A * | 5/1996 | Bartlett .................. 455/574 |
| 5,541,976 A | 7/1996 | Ghisler |
| 5,623,533 A | 4/1997 | Kikuchi et al. |
| 5,625,882 A * | 4/1997 | Vook et al. .................. 455/343.4 |
| 5,842,141 A | 11/1998 | Vaihoja et al. |
| 5,918,170 A | 6/1999 | Oksanen et al. |
| 5,991,635 A | 11/1999 | Dent et al. |
| 6,067,460 A | 5/2000 | Alanara et al. |
| 6,445,937 B1 * | 9/2002 | daSilva .................. 455/574 |
| 6,473,607 B1 | 10/2002 | Shohara et al. |
| 6,535,985 B1 * | 3/2003 | Oshima et al. .................. 713/323 |
| 6,542,726 B2 | 4/2003 | Watanabe |
| 6,633,753 B1 | 10/2003 | Kido |
| 6,668,329 B1 | 12/2003 | Rudd et al. |
| 7,623,893 B2 * | 11/2009 | Cupps et al. .................. 455/556.2 |
| 7,899,418 B2 | 3/2011 | Ishiyama et al. |
| 7,904,023 B2 | 3/2011 | Viitamaki et al. |
| 8,036,718 B2 * | 10/2011 | Lencevicius et al. ......... 455/574 |
| 8,050,724 B2 * | 11/2011 | Park .......................... 455/127.5 |
| 2004/0127265 A1 | 7/2004 | Van Bosch et al. |
| 2004/0147277 A1 | 7/2004 | Kaewell et al. |
| 2004/0176065 A1 * | 9/2004 | Liu .......................... 455/343.1 |
| 2008/0291838 A1 * | 11/2008 | Jaakkola et al. ............ 455/343.2 |

FOREIGN PATENT DOCUMENTS

| | | |
|---|---|---|
| JP | 11-136158 | 5/1999 |
| KR | 1994-0012867 | 6/1994 |
| WO | WO 93/18596 | 9/1993 |

\* cited by examiner

METHOD FOR CONTROLLING POWER IN WIRELESS TELEPHONE SET

PRIORITY

This application is a Continuation of U.S. application Ser. No. 09/739,560, which was filed in the U.S. Patent and Trademark Office on Dec. 18, 2000, now U.S. Pat. No. 8,050,724 and claims priority under 35 U.S.C. §119(a) to Korean Application Serial No. 99-65274, which was filed in the Korean Industrial Property Office on Dec. 29, 1999, the content of each of which is hereby incorporated by reference.

BACKGROUND OF THE INVENTION

1. Field of the Invention

The present invention relates generally to a wireless telephone set, and in particular, to a method for reducing power consumption in the wireless telephone set.

2. Description of the Related Art

Methods for increasing available time for using a wireless telephone set without charging the battery typically include increasing the capacity of the battery or employing a low-power circuit. However, these hardware solutions generally pose a limit in the increase of available time for using the wireless telephone set.

SUMMARY OF THE INVENTION

Accordingly, the present invention is designed to address at least the problems and/or disadvantages and to provide at least the advantages described below.

It is, therefore, an aspect of the present invention to provide a method for increasing available usage time of a wireless telephone set.

It is another aspect of the present invention to provide a method for increasing available usage time of a wireless telephone set without requiring additional dedicated circuitry or additional battery capacity.

In accordance with an aspect of the present invention, a method for controlling power in a wireless telephone set is provided. The method includes controlling a power supply to a receiving section and a transmitting section by using a transmitting section turn-on signal to turn on the transmitting section when the transmitting section turn-on signal is received in a slot mode for alternating between a receiving condition and a sleeping condition at predetermined intervals; and when the transmitting section turn-on signal is not received, controlling the power supply to the receiving section according to the receiving condition of slot mode control signals during the slot mode when no interrupting signal has been detected.

BRIEF DESCRIPTION OF THE DRAWINGS

The above and other aspects, features and advantages of the present invention will become more apparent from the following detailed description when taken in conjunction with the accompanying drawings, in which.

DETAILED DESCRIPTION OF EMBODIMENTS OF THE INVENTION

Figure 1:
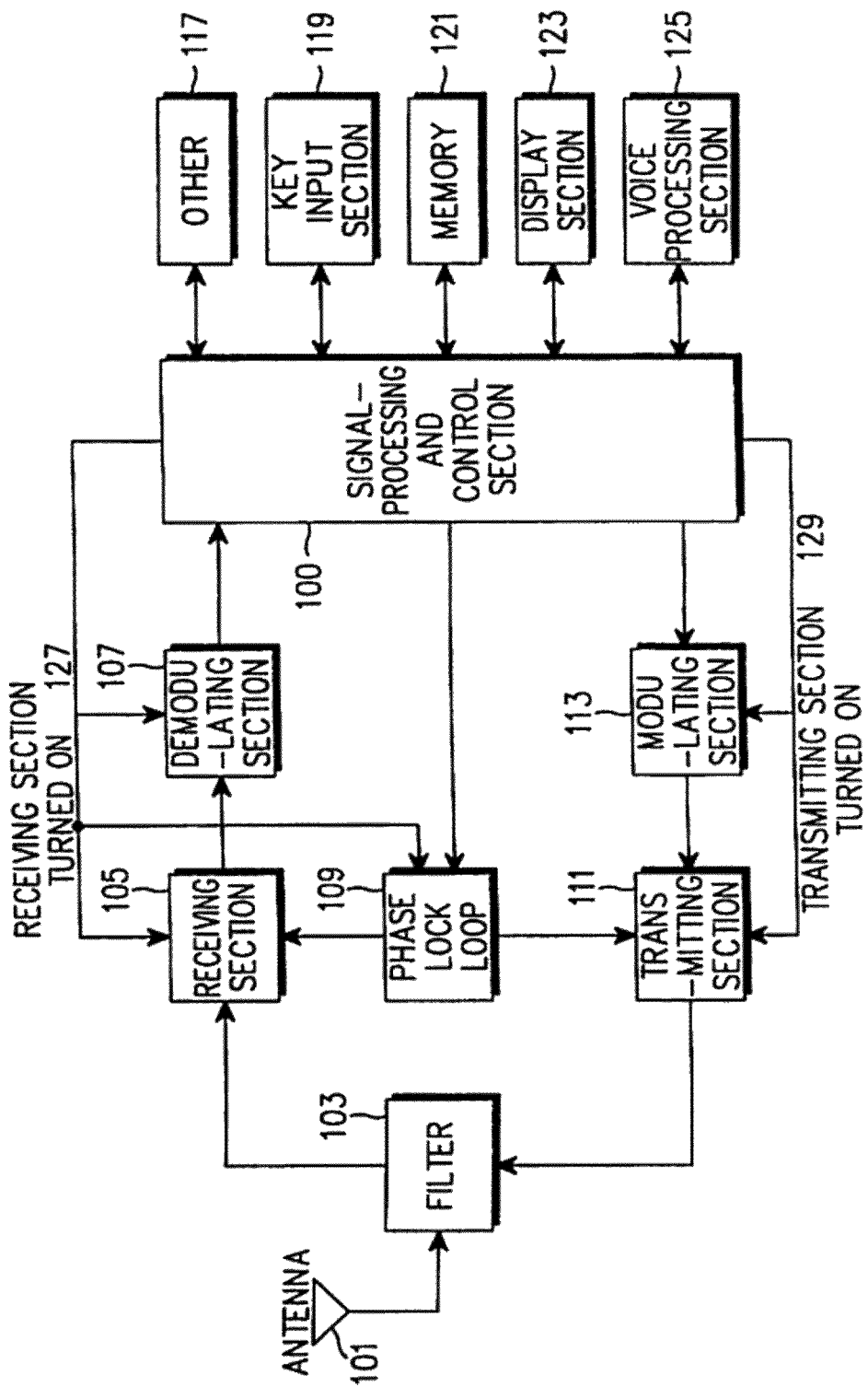
FIG. 1 is a schematic block diagram illustrating a construction of a wireless telephone set in accordance with an embodiment of the present invention.

Various embodiments of the present invention will be described herein below with reference to the accompanying drawings. In the following description, well-known functions or constructions are not described in detail since they would obscure the invention in unnecessary detail.

First, a description of the construction of a wireless telephone set in accordance with an embodiment of the present invention will be made with reference to FIG. 1.

Signals received by an antenna 101 are input by a receiving section 105 through a filter 103. The receiving section 105 down-converts and amplifies the input signals, and a demodulating section 107 demodulates the signals outputted by the receiving section 105 and outputs the signals to a signal-processing and control section 100. The signal-processing and control section 100 processes the signals inputted through a microphone and outputs the signals through a modulating section 113 to a transmitting section 111. Here, the transmitting section 111 outputs the signals to the antenna 101 by up-converting the frequency to a transmission frequency band and, amplifying and filtering the same. A phase lock loop 109 provides a local oscillating frequency to the transmitting section 111 and the receiving section 105, so as to convert the received signals or the transmitted signals into the desired frequency. On the other hand, the signal-processing and control section 100 controls the signal processing and data receipt/transmission within each section of the wireless telephone set, and outputs signals for controlling the electric power supply to each section of the wireless telephone set according to the conditions of the wireless telephone set and a mode selection.

An operation of the wireless telephone set will be described hereinbelow in accordance with an embodiment of the present invention with reference to FIGS. 1 and 2.

The signal-processing and control section 100 detects whether or not any interrupting signals have been generated in step 200, e.g., when a call message or paging message has been received, an alarm timer has expired or a key is inputted by a key input section 119. The generation of interrupting signals signifies that signals have been generated requiring the controller to turn on a power supply serving each corresponding section of the wireless telephone set. Each section is periodically polled, preferably every 320 ms, for a short duration, preferably 10 ms, to detect the presence of interference signals.

If any interrupting signals have been generated, the signal-processing and control section 100 changes a power control mode of the wireless telephone set into a user mode and turns on the power supply to corresponding sections of the wireless telephone set according to the generated interrupting signals in step 210. For example, when a user inputs a key in order to edit telephone numbers in the wireless telephone set, power is supplied to a display section 123 and the key input section 119. The user mode is processed according to the generated interrupting signals in step 220. The power consumed in the user mode is less than the power consumed in the conventional transmission condition and the power consumed in the receiving condition of a slot mode.

The signal-processing and control section 100 detects whether or not the signals are being transmitted in step 230. To be specific, if the user has requested the transmission of signals, the signal-processing and control section 100 supplies power to the transmitting section 111 and the receiving section 105 in step 240, and performs transmitting operations in steps 240 and 250. Otherwise, the procedure returns to step 200.

When no interrupting signals are generated in step 200, a slot mode is operated in step 270, and therefore a sleeping condition and a receiving condition are periodically repeated in step 270. Step 200 is also performed simultaneously.

A description of the chronological variances of power consumption according to a preferred embodiment of the present invention will be made with reference to FIGS. 3a to 3c.

Figure 3A:
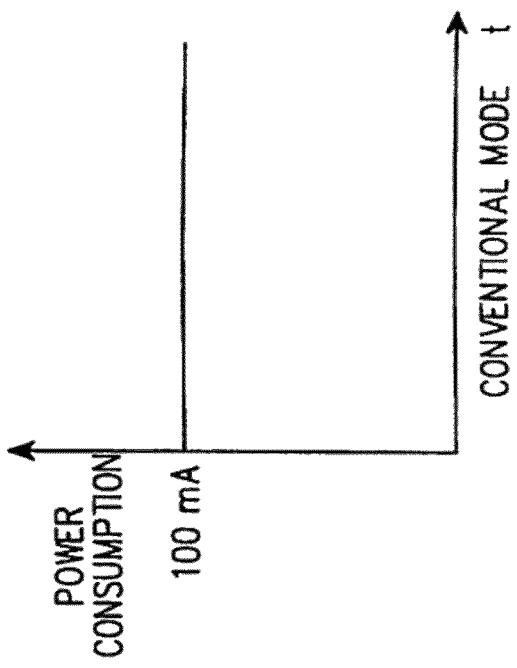
FIG. 3a is a graph illustrating chronological variances of a power consumption in the conventional slot mode.

FIG. 3a is a graph illustrating chronological variances of the power consumption during the slot mode. The slot mode is divided into a sleeping condition and a receiving condition, and repeats the above conditions at regular intervals. As shown in the graph of FIG. 3a, less power is consumed in the sleeping condition than in the receiving condition since power is supplied to only the sections necessary for control during the sleeping condition.

Figure 3B:
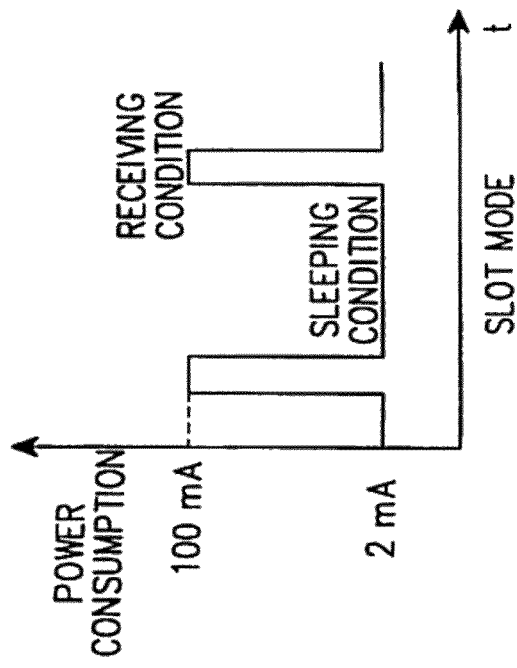
FIG. 3b is a graph illustrating chronological variances of a power consumption in a normal mode.

FIG. 3b is a graph illustrating power consumption variations during a conventional mode. Referring to FIG. 3b, the supplied power is regularly consumed.

Figure 3C:
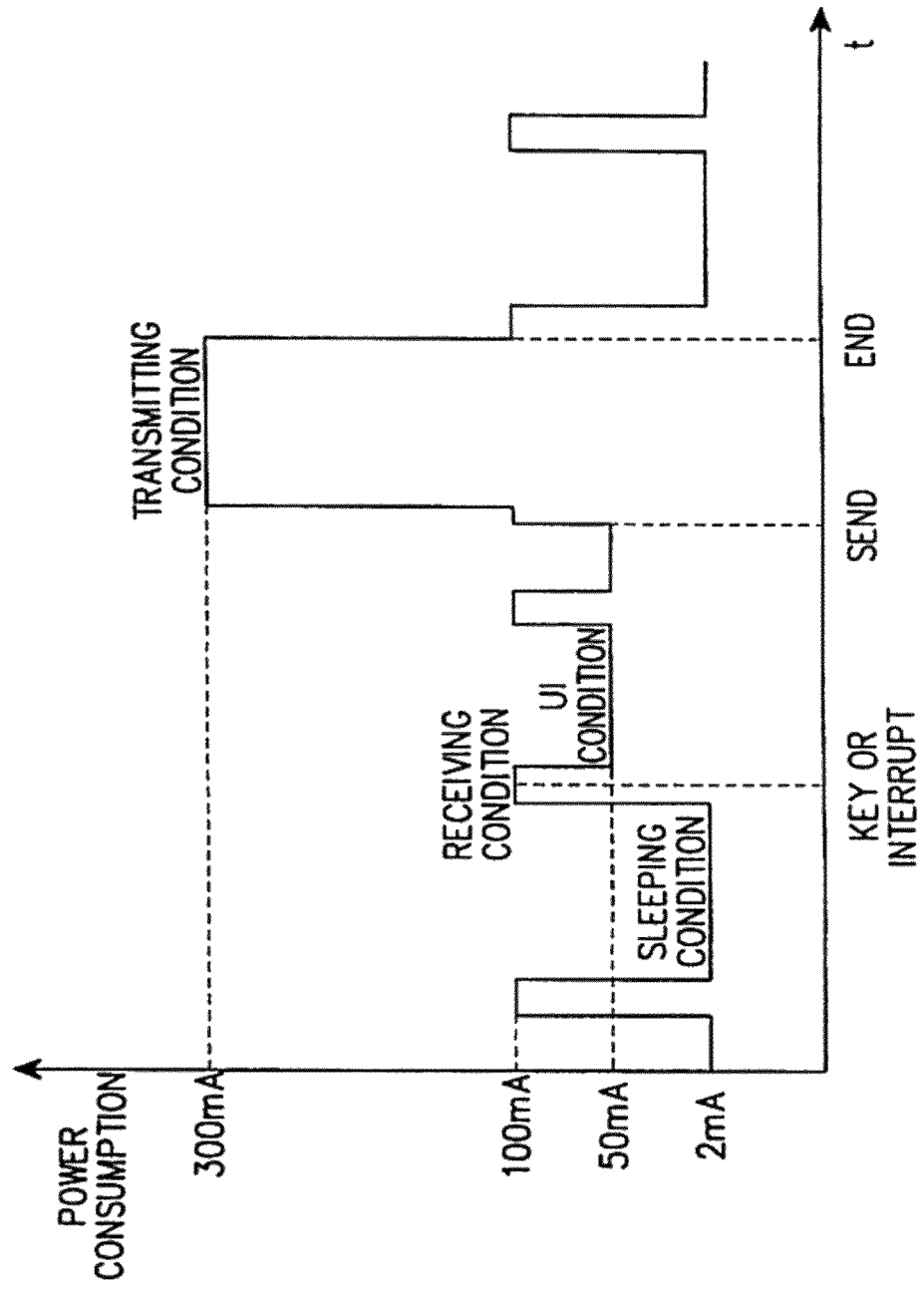
FIG. 3c is a graph illustrating chronological variances of a power consumption in accordance with an embodiment of the present invention.

FIG. 3c is a graph illustrating power consumption variations in accordance with the preferred embodiment of the present invention. Referring to FIG. 3c, the interrupting signals are generated in step 200 in the slot mode or the control mode, thereby setting the wireless telephone set into a user mode in step 210. When the receiving condition is entered from either the user mode or the slot mode, the power is supplied to the receiving section 105 to perform the receiving operation. While in the user mode, however, less power is consumed than while in the slot mode. In other words, according to a preferred embodiment of the present invention, the user mode is added so as to minutely control the power in the wireless telephone set. For example, in a conventional telephone set when a user inputs a key while in the slot mode, the same amount of power is consumed as when in the receiving condition of the slot mode. However, according to the preferred embodiment of the present invention, the power is supplied to only the sections necessary for operations according to generation of the interrupting signals, thereby resulting in a reduction of the overall power consumption as shown in the graph of FIG. 3c. On the other hand, if the user mode is terminated, and there is a request for the transmission of signals, the power consumption consequently increases to that of the conventional telephone set as shown in FIG. 3c. After the transmission operation is terminated, the slot mode is again operated.

Although the receiving condition generated by receiving the call messages is not described above, a similar operation to that of the transmission condition is applicable to that case, as is evident.

Another embodiment of the present invention is described herein below with reference to FIGS. 4 and 5.

Figure 2:
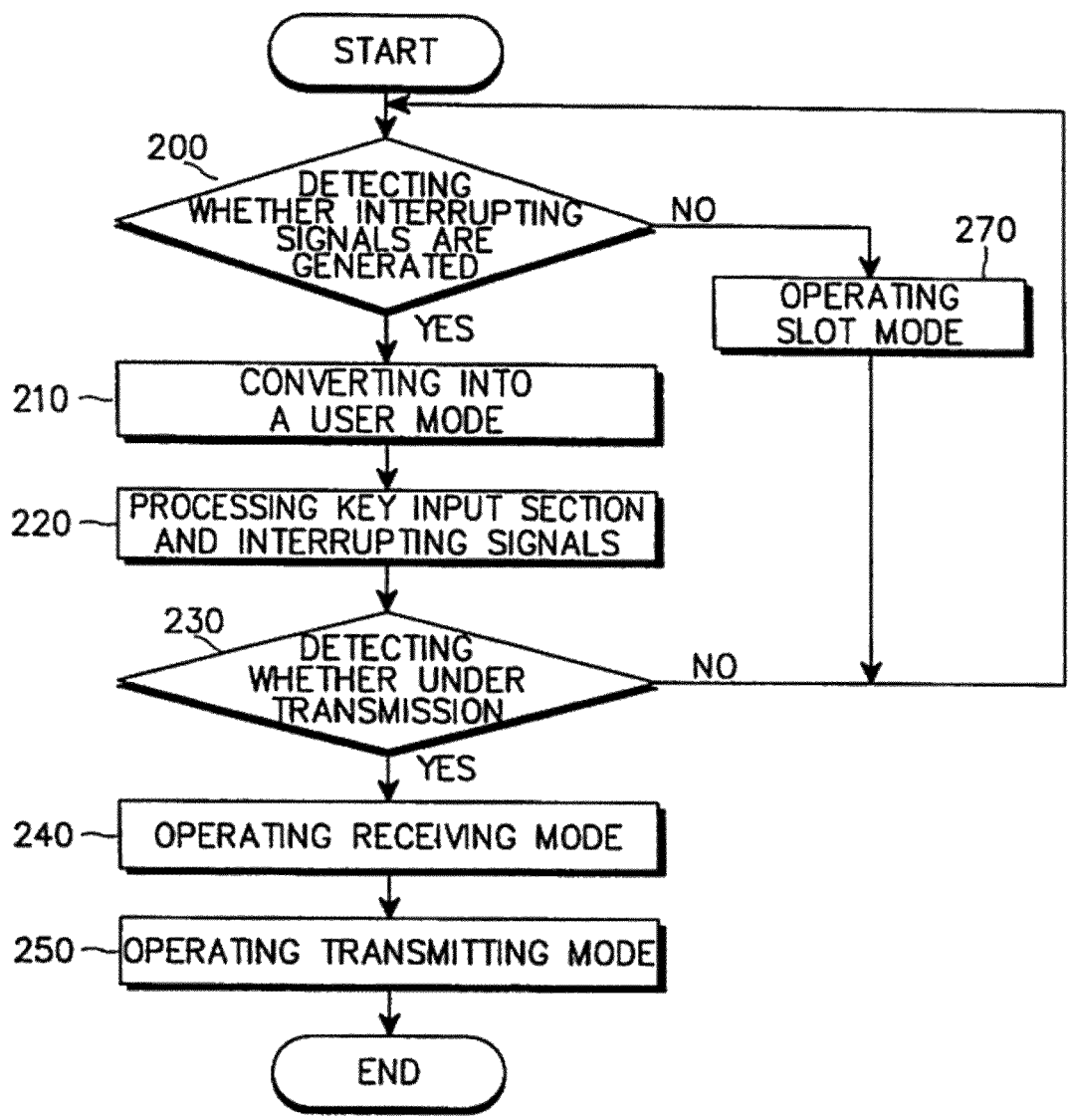
FIG. 2 is a flow chart illustrating a control of power in the wireless telephone set in accordance with an embodiment of the present invention.
Figure 4:
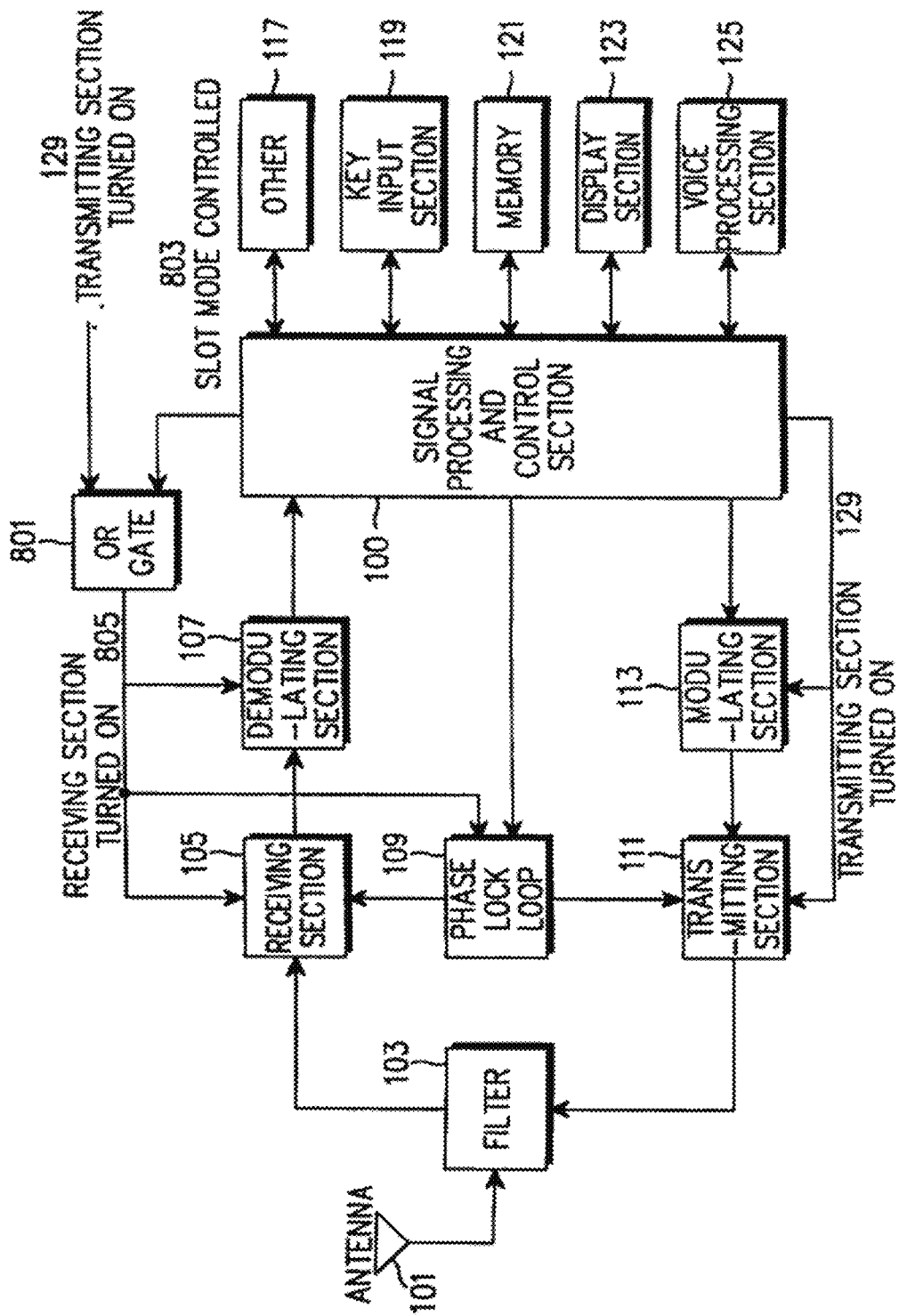
FIG. 4 is a schematic block diagram illustrating a construction of the wireless telephone set in accordance with another embodiment of the present invention.

FIG. 4 is a block diagram illustrating the construction of a wireless telephone set, which is similar to that of the wireless telephone set in FIG. 1. Referring to FIG. 4, additional hardware is added for controlling the power supply to the receiving section 105. The power supply to the receiving section 105 is controlled by logically adding slot mode control signals outputted by a signal-processing section 100 and transmitting section control signals 129 by means of an OR gate 801. To be specific, whenever the signals for turning-on the power supply are generated in the transmitting section 111 or the slot mode, the power is turned on.

Figure 5:
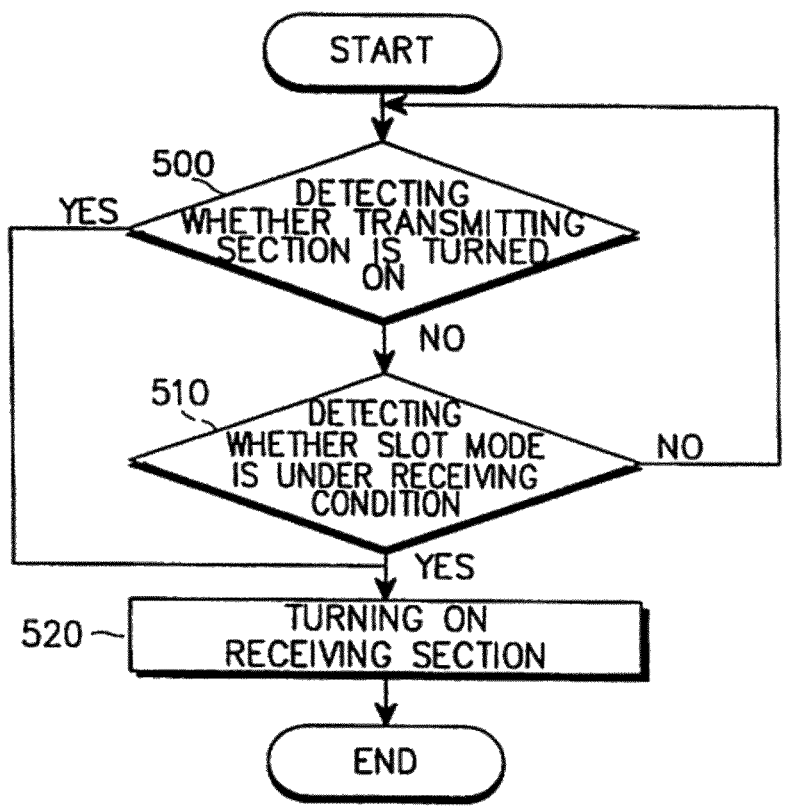
FIG. 5 is a flow chart illustrating a control of the wireless telephone set in accordance with another embodiment of the present invention.

With reference also to FIG. 5, an operation of the preferred embodiment of FIG. 4 according to the present invention will be described. If the signals for turning-on the electric power supply to the transmitting section 111 is detected in step 500, the receiving section 105 is turned on and the receiving operation is performed in step 520. Otherwise, the phone detects whether or not the slot mode is under a receiving condition in step 510. If the slot mode is under a receiving condition, the receiving section 105 is turned on and the receiving operation is performed in step 520. If not, the procedure returns to step 500.

As described above, the various embodiments of the present invention provide an advantage of enhancing the available time for using a wireless telephone set by discriminating the control of the power supply to the wireless telephone set in accordance with the modes.

While the present invention has been shown and described with reference to certain embodiments thereof, it will be understood by those skilled in the art that various changes in form and details may be made therein without departing from the spirit and scope of the invention as defined by the appended claims.

What is claimed is:

1. A method for controlling power in a wireless telephone set, the method comprising the steps of:
    operating, by the wireless telephone set, in a slot mode, in which the wireless telephone set alternates between a receiving condition and a sleeping condition at predetermined intervals;
    converting from the slot mode into a user mode, when an interrupting signal is generated;
    when a request for transmission of a signal is received in the user mode, operating, by the wireless telephone set, in a transmission condition; and
    when a transmission operation in the transmission condition is terminated, operating, by the wireless telephone set, in the slot mode,
    wherein in the user mode the wireless telephone set supplies power only to a section necessary for a predetermined operation according to an origin of the interrupting signal, and
    wherein power consumed by the wireless telephone set operating in the user mode is less than power consumed by the wireless telephone set in the transmission condition, and power consumed by the wireless telephone set operating in the slot mode is less than the power consumed by the wireless telephone set in the user mode.

2. The method of claim 1, further comprising the steps of:
    when the predetermined operation is terminated, detecting whether or not there is a requirement for signal transmission; and
    converting from the user mode into the slot mode, when there is no requirement for the signal transmission.

3. The method of claim 1, further comprising the steps of:
    when the predetermined operation is terminated, detecting whether or not there is a requirement for signal transmission; and converting from the user mode into the transmission mode that supplies power to a transmitting section and a receiving section, when there is the requirement for the signal transmission.

4. The method of claim 1, wherein the section necessary for the predetermined operation includes a display section of the wireless telephone set and a key input section of the wireless telephone set.

5. The method of claim 1, further comprising the steps of:
controlling a power supply to a receiving section and a transmitting section by using a transmitting section turn-on signal to turn on the transmitting section, when the transmitting section turn-on signal is received before converting from the slot mode into the user mode.

6. The method of claim 5, wherein the receiving section power supply is controlled by performing a logical OR operation on the transmitting section turn-on signal and the slot mode control signals to control the turning-on of the power supply.

7. The method of claim 5, further comprising:
when the transmitting section turn-on signal is not received, controlling the power supply to the receiving section according to the receiving condition of slot mode control signals, when no interrupting signal has been detected, without converting from the slot mode into the user mode; and
when the transmitting section turn-on signal is not received, controlling the power supply to at least one section necessary for at least one predetermined operation according to an origin of the interrupting signal, when the interrupting signal has been detected without converting from the slot mode into the user mode.

8. The method of claim 1, wherein when the origin of the interrupting signal is a key input section of the wireless telephone set, the section necessary for the predetermined operation includes a display section of the wireless telephone set.

9. The method of claim 1, wherein the wireless telephone set alternates between the receiving condition and a user input condition at predetermined intervals.

10. The method of claim 9, wherein power consumed by the wireless telephone set operating in the receiving condition is less than power consumed by the wireless telephone set in the user input condition, and power consumed by the wireless telephone set operating in the sleeping condition is less than the power consumed by the wireless telephone set in the user input condition.

11. A wireless telephone set comprising:
a transmitting section for signal transmission;
a receiving section for signal reception; and
a controller configured to:
operate the wireless telephone set in a slot mode, in which the wireless telephone set alternates between a receiving condition and a sleeping condition at predetermined intervals,
convert from the slot mode into a user mode, when an interrupting signal is generated,
when a request for transmission of a signal is received in the user mode, operate in a transmission condition, and
when a transmission operation in the transmission condition is terminated, operate in the slot mode,
wherein in the user mode, the wireless telephone set supplies power only to a section necessary for a predetermined operation according to an origin of the interrupting signal, and
wherein power consumed by the wireless telephone set operating in the user mode is less than power consumed by the wireless telephone set in the transmission condition, and power consumed by the wireless telephone set operating in the slot mode is less than the power consumed by the wireless telephone set in the user mode.

12. The wireless telephone set of claim 11, wherein the controller is further configured to:
detect whether or not there is a requirement for the signal transmission, when the predetermined operation is terminated, and
convert from the user mode into the slot mode, when there is no requirement for the signal transmission.

13. The wireless telephone set of claim 11, wherein the controller is further configured to:
detect whether or not there is a requirement for the signal transmission, when the predetermined operation is terminated, and
convert from the user mode into a transmission mode that supplies power to the transmitting section and the receiving section, when there is the requirement for the signal transmission.

14. The wireless telephone set of claim 11, wherein the section necessary for the predetermined operation includes a display section of the wireless telephone set and a key input section of the wireless telephone set.

15. The wireless telephone set of claim 11, wherein the controller is further configured to:
control power supply to the receiving section and the transmitting section by using a transmitting section turn-on signal to turn on the transmitting section, when the transmitting section turn-on signal is received before converting from the slot mode into the user mode.

16. The wireless telephone set of claim 15, wherein the power supply to the receiving section is controlled by performing a logical OR operation on the transmitting section turn-on signal and slot mode control signals to control turning-on of the power supply.

17. The wireless telephone set of claim 16, wherein, when the transmitting section turn-on signal is not received, the controller is further configured to:
control the power supply to the receiving section according to a receiving condition of the slot mode control signals, when no interrupting signal has been detected, without converting from the slot mode into the user mode; and
control the power supply to at least one section necessary for at least one predetermined operation according to an origin of the interrupting signal, when the interrupting signal has been detected, without converting from the slot mode into the user mode.

18. The wireless telephone set of claim 11, wherein when the origin of the interrupting signal is a key input section of the wireless telephone set, the section necessary for the predetermined operation includes a display section of the wireless telephone set.

19. The wireless telephone set of claim 11, wherein the wireless telephone set alternates between the receiving condition and a user input condition at predetermined intervals.

20. The wireless telephone set of claim 19, wherein power consumed by the wireless telephone set operating in the receiving condition is less than power consumed by the wireless telephone set in the user input condition, and power consumed by the wireless telephone set operating in the sleeping condition is less than the power consumed by the wireless telephone set in the user input condition.

* * * * *